US012659942B2

(12) United States Patent
Liu et al.

(10) Patent No.: US 12,659,942 B2
(45) Date of Patent: Jun. 16, 2026

(54) FREQUENCY DOMAIN RESOURCE ALLOCATION FOR SIDELINK INTERLACED WAVEFORMS

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 698 days.

(21) Appl. No.: 17/649,309

(22) Filed: Jan. 28, 2022

(65) Prior Publication Data

US 2023/0247619 A1 Aug. 3, 2023

(51) Int. Cl.
H04W 72/12 (2023.01)
H04W 72/20 (2023.01)

(52) U.S. Cl.
CPC ........... H04W 72/12 (2013.01); H04W 72/20 (2023.01)

(58) Field of Classification Search
None
See application file for complete search history.

(56) References Cited

U.S. PATENT DOCUMENTS

| | | | |
|---|---|---|---|
| 2020/0260472 A1 | 8/2020 | Ganesan et al. | |
| 2020/0403737 A1* | 12/2020 | Yeo | H04W 52/367 |
| 2022/0007403 A1* | 1/2022 | Li | H04W 72/23 |
| 2022/0377619 A1* | 11/2022 | Grant | H04L 5/0041 |
| 2023/0133612 A1* | 5/2023 | Ganesan | H04W 16/14 |
| | | | 370/329 |
| 2023/0199770 A1* | 6/2023 | Hu | H04W 72/20 |
| | | | 370/329 |
| 2023/0337259 A1* | 10/2023 | Son | H04W 76/28 |
| 2024/0040595 A1* | 2/2024 | Peng | H04L 5/0055 |
| 2024/0137929 A1* | 4/2024 | Dong | H04L 5/0055 |
| 2024/0205948 A1* | 6/2024 | Selvanesan | H04L 5/0037 |
| 2025/0097916 A1* | 3/2025 | Zhao | H04W 72/40 |

FOREIGN PATENT DOCUMENTS

| | | |
|---|---|---|
| WO | WO-2021203326 A1 | 10/2021 |
| WO | WO-2021217562 A1 | 11/2021 |

OTHER PUBLICATIONS

Ericsson: "Feature lead summary for UL Signals and Channels", 3GPP TSG-RAN WG1 Meeting #98, R1-1909729 (R1-190xxxx), 3rd Generation Partnership Project (3GPP), Mobile Competence Centre, 650, Route Des Lucioles, F-06921 Sophia-A, vol. RAN WG1, No. Prague, Czech Republic, Aug. 26, 2019-Aug. 30, 2019, 25 Pages, Sep. 3, 2019, XP051766322, p. 19.
International Search Report and Written Opinion—PCT/US2023/060076—ISA/EPO—Apr. 24, 2023.

* cited by examiner

*Primary Examiner* — Saumit Shah
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration of a frequency domain resource allocation (FDRA) associated with one or more scheduled interlaces for sidelink communication, wherein the FDRA is based at least in part on a resource block (RB) associated with a first stage sidelink control information (SCI-1) communication. The UE may perform the sidelink communication in accordance with the FDRA. Numerous other aspects are described.

30 Claims, 9 Drawing Sheets

700

710 ~ Receive a configuration of a frequency domain resource allocation (FDRA) associated with one or more scheduled interlaces for sidelink communication, wherein the FDRA is based at least in part on a resource block (RB) associated with a first stage sidelink control information (SCI-1) communication 720 ~ Perform the sidelink communication in accordance with the FDRA

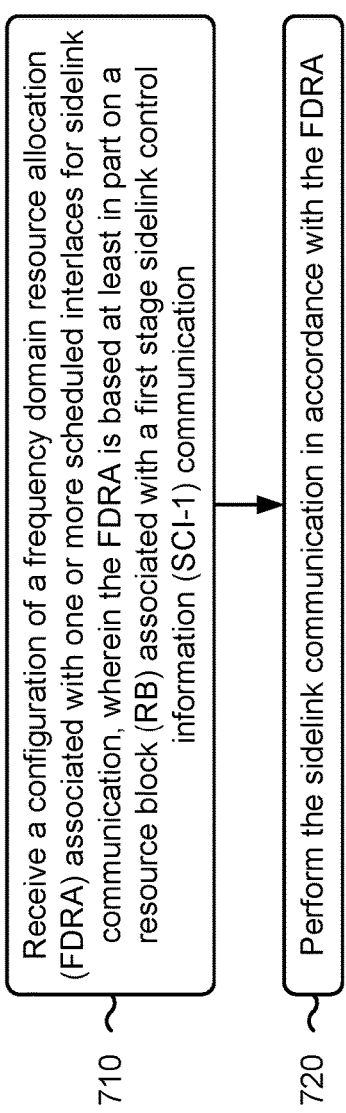

Receive a configuration of a frequency domain resource allocation (FDRA) associated with one or more scheduled interlaces for sidelink communication, wherein the FDRA is based at least in part on a resource block (RB) associated with a first stage sidelink control information (SCI-1) communication

710

Perform the sidelink communication in accordance with the FDRA

810 Receive a configuration of an FDRA associated with one or more scheduled interlaces for sidelink communication, wherein the FDRA is based at least in part on a common reference RB 820 Perform the sidelink communication in accordance with the FDRA

FREQUENCY DOMAIN RESOURCE ALLOCATION FOR SIDELINK INTERLACED WAVEFORMS

FIELD OF THE DISCLOSURE

Aspects of the present disclosure generally relate to wireless communication and to techniques and apparatuses for a frequency domain resource allocation (FDRA) for sidelink interlaced waveforms.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration of a frequency domain resource allocation (FDRA) associated with one or more scheduled interlaces for sidelink communication, wherein the FDRA is based at least in part on a resource block (RB) associated with a first stage sidelink control information (SCI-1) communication. The method may include performing the sidelink communication in accordance with the FDRA.

Some aspects described herein relate to a method of wireless communication performed by a UE. The method may include receiving a configuration of an FDRA associated with one or more scheduled interlaces for sidelink communication, wherein the FDRA is based at least in part on a common reference point. The method may include performing the sidelink communication in accordance with the FDRA.

Some aspects described herein relate to an apparatus for wireless communication at a UE. The apparatus may include a memory and one or more processors coupled to the memory. The one or more processors may be configured to receive a configuration of an FDRA associated with one or more scheduled interlaces for sidelink communication, wherein the FDRA is based at least in part on an RB associated with an SCI-1 communication. The one or more processors may be configured to perform the sidelink communication in accordance with the FDRA.

Some aspects described herein relate to an apparatus for wireless communication at a UE. The apparatus may include a memory and one or more processors coupled to the memory. The one or more processors may be configured to receive a configuration of an FDRA associated with one or more scheduled interlaces for sidelink communication, wherein the FDRA is based at least in part on a common reference point. The one or more processors may be configured to perform the sidelink communication in accordance with the FDRA.

Some aspects described herein relate to a non-transitory computer-readable medium that stores a set of instructions for wireless communication by a UE. The set of instructions, when executed by one or more processors of the UE, may cause the UE to receive a configuration of an FDRA associated with one or more scheduled interlaces for sidelink communication, wherein the FDRA is based at least in part on an RB associated with an SCI-1 communication. The set of instructions, when executed by one or more processors of the UE, may cause the UE to perform the sidelink communication in accordance with the FDRA.

Some aspects described herein relate to a non-transitory computer-readable medium that stores a set of instructions for wireless communication by a UE. The set of instructions, when executed by one or more processors of the UE, may cause the UE to receive a configuration of an FDRA associated with one or more scheduled interlaces for sidelink communication, wherein the FDRA is based at least in part on a common reference point. The set of instructions, when executed by one or more processors of the UE, may cause the UE to perform the sidelink communication in accordance with the FDRA.

Some aspects described herein relate to an apparatus for wireless communication. The apparatus may include means for receiving a configuration of an FDRA associated with one or more scheduled interlaces for sidelink communication, wherein the FDRA is based at least in part on an RB associated with an SCI-1 communication. The apparatus may include means for performing the sidelink communication in accordance with the FDRA.

Some aspects described herein relate to an apparatus for wireless communication. The apparatus may include means for receiving a configuration of an FDRA associated with one or more scheduled interlaces for sidelink communication, wherein the FDRA is based at least in part on a common reference point. The apparatus may include means for performing the sidelink communication in accordance with the FDRA.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
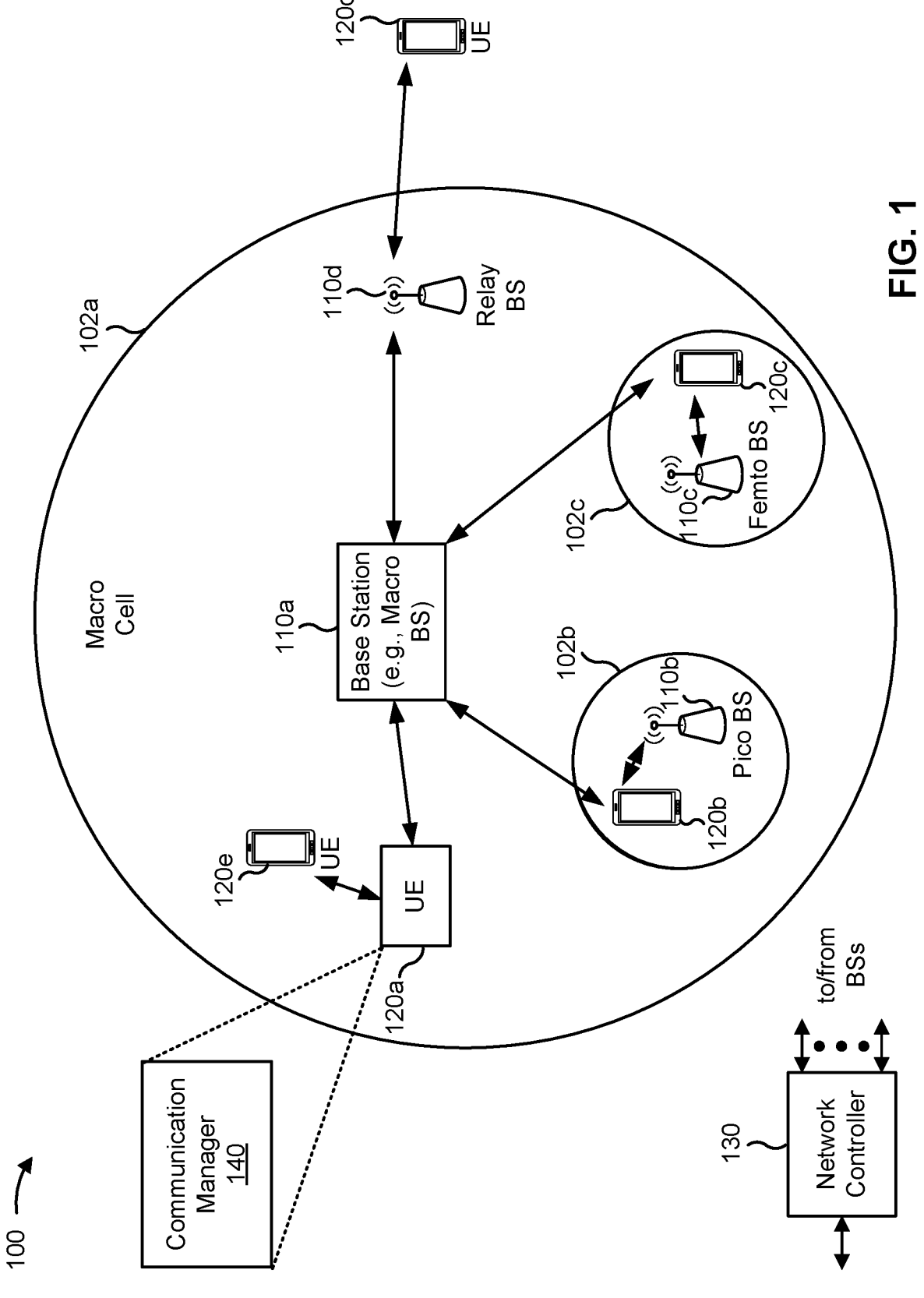
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration of a frequency domain resource allocation (FDRA) associated with one or more scheduled interlaces for sidelink communication, wherein the FDRA is based at least in part on a resource block (RB) associated with a first stage sidelink control information (SCI-1) communication; and perform the sidelink communication in accordance with the FDRA. Additionally, or alternatively, the communication manager 140 may perform one or more other operations described herein.

In some other aspects, and as described in more detail elsewhere herein, the communication manager 140 may receive a configuration of an FDRA associated with one or more scheduled interlaces for sidelink communication, wherein the FDRA is based at least in part on a common reference point; and perform the sidelink communication in accordance with the FDRA. Additionally, or alternatively, the communication manager 140 may perform one or more other operations described herein.

As indicated above, FIG. 1 is provided as an example. Other examples may differ from what is described with regard to FIG. 1.

Figure 2:
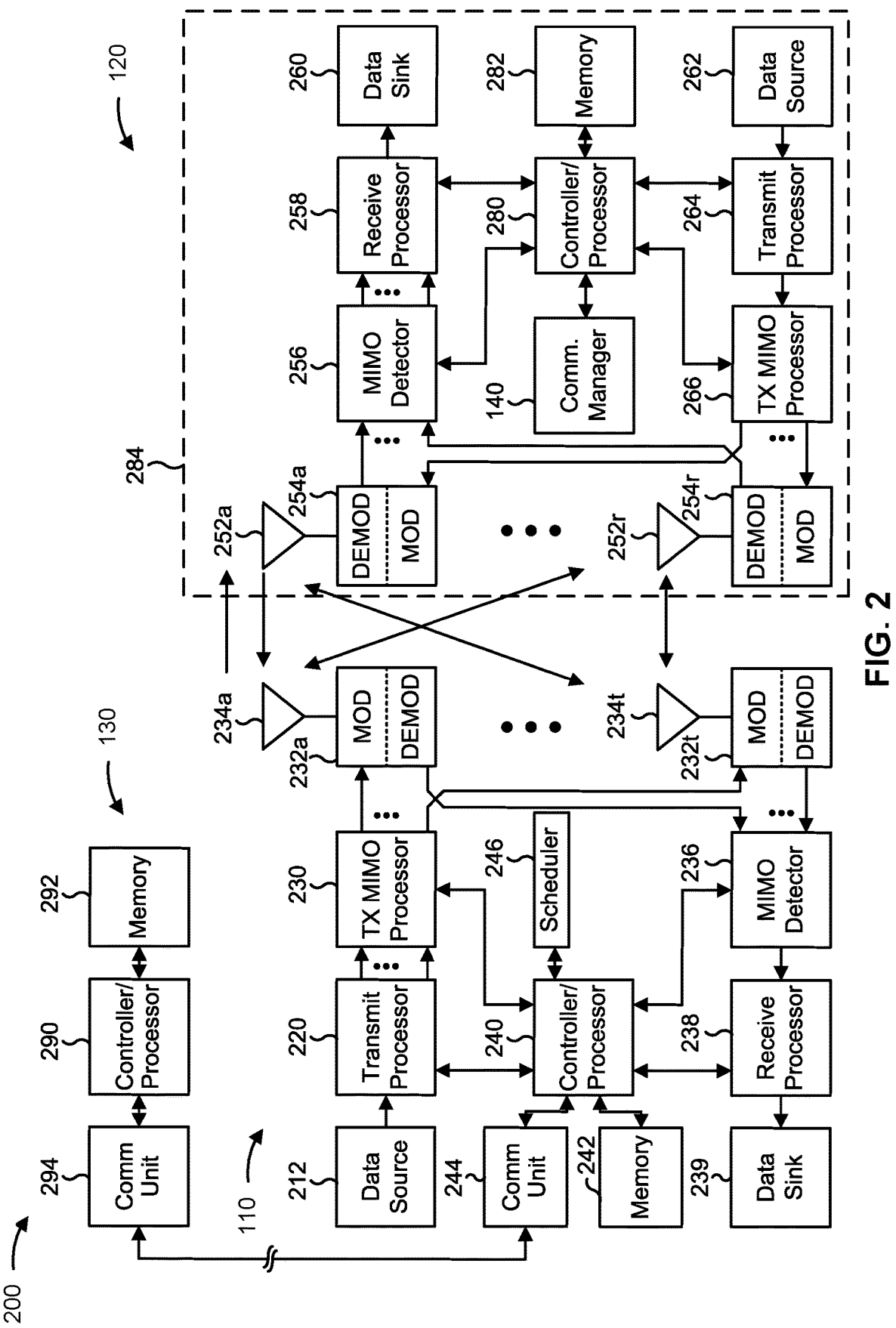
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

Although for ease of description the base station 110 is described as a single network entity, aspects of the disclosure are not so limited. In some other aspects, the base station 110 or another network entity may be disaggregated according to an open radio access network (RAN) (O-RAN) architecture or similar architecture. The O-RAN architecture may include a control unit (CU) that communicates with a core network via a backhaul link. Furthermore, the CU may communicate with one or more distributed units (DUs) via respective midhaul links. The DUs may each communicate with one or more radio units (RUs) via respective fronthaul links, and the RUs may each communicate with respective UEs 120 via radio frequency (RF) access links. The DUs and the RUs may also be referred to as O-RAN DUS (O-DUs) and O-RAN RUs (O-RUs), respectively.

In some aspects, the DUs and the RUs may be implemented according to a functional split architecture in which functionality of a base station 110 (e.g., an eNB or a gNB) is provided by a DU and one or more RUs that communicate over a fronthaul link. Accordingly, as described herein, a base station 110 may include a DU and one or more RUs that may be co-located or geographically distributed. In some aspects, the DU and the associated RU(s) may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU may correspond to a logical unit that includes one or more base station functions to control the operation of one or more RUs. For example, in some aspects, the DU may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU. The RU(s) controlled by a DU may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) handle all over the air (OTA) communication with a UE 120, and real-time and non-real-time aspects of control and user plane communication with the RU(s) are controlled by the corresponding DU, which enables the DU(s) and the CU to be implemented in a cloud-based RAN architecture.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with an FDRA for sidelink interlaced waveforms, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving a configuration of an FDRA associated with one or more scheduled interlaces for sidelink communication, wherein the FDRA is based at least in part on an RB associated with a SCI-1 communication; and/or means for performing the sidelink communication in accordance with the FDRA. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving a configuration of an FDRA associated with one or more scheduled interlaces for sidelink communication, wherein the FDRA is based at least in part on a common reference point; and/or means for performing the sidelink communication in accordance with the FDRA. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
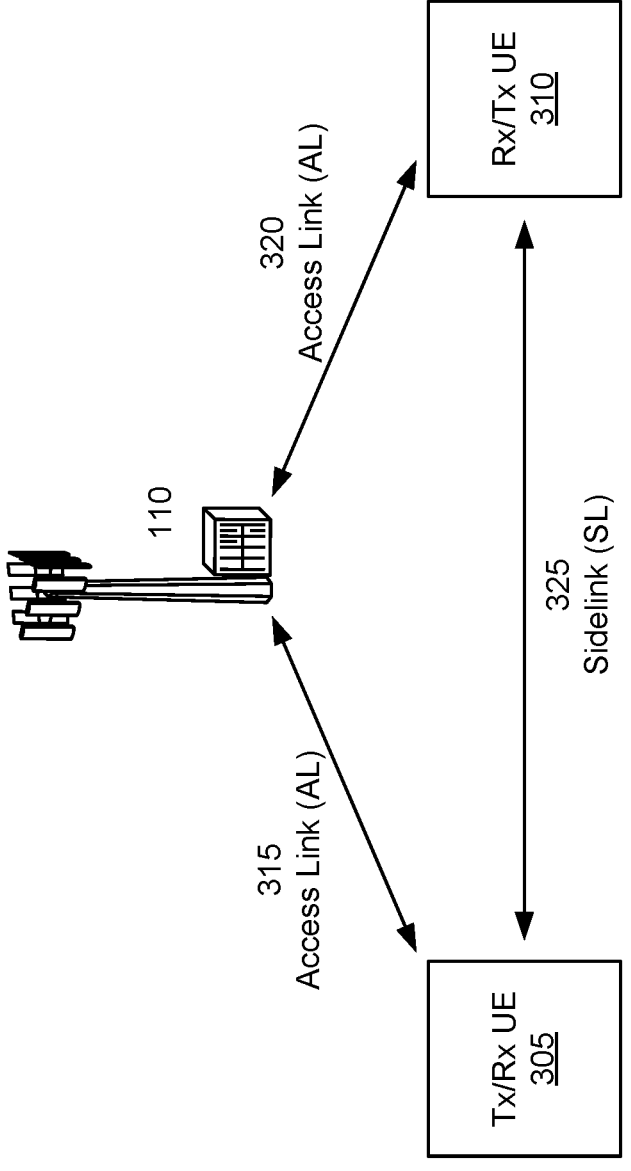
FIG. 3 is a diagram illustrating an example of sidelink communications and access link communications, in accordance with the present disclosure.

FIG. 3 is a diagram illustrating an example 300 of sidelink communications and access link communications, in accordance with the present disclosure.

As shown in FIG. 3, a transmitter (Tx)/receiver (Rx) UE 305 and an Rx/Tx UE 310 may communicate with one another via a sidelink. In some sidelink modes, a base station 110 may communicate with the Tx/Rx UE 305 via a first access link 315. Additionally, or alternatively, in some sidelink modes, the base station 110 may communicate with the Rx/Tx UE 310 via a second access link 320. The Tx/Rx UE 305 and/or the Rx/Tx UE 310 may correspond to one or more UEs described elsewhere herein, such as the UE 120 of FIG. 1. Thus, a direct link between UEs 120 (e.g., via a PC5 interface) may be referred to as a sidelink 325, and a direct link between a base station 110 and a UE 120 (e.g., via a Uu interface) may be referred to as an access link 315, 320. Sidelink communications may be transmitted via the sidelink 325, and access link communications may be transmitted via the access link 315, 320. An access link communication may be either a downlink communication (from a base station 110 to a UE 120) or an uplink communication (from a UE 120 to a base station 110). Aspects of the sidelink 325 are described in more detail below in connection with FIG. 4.

As indicated above, FIG. 3 is provided as an example. Other examples may differ from what is described with respect to FIG. 3.

Figure 4:
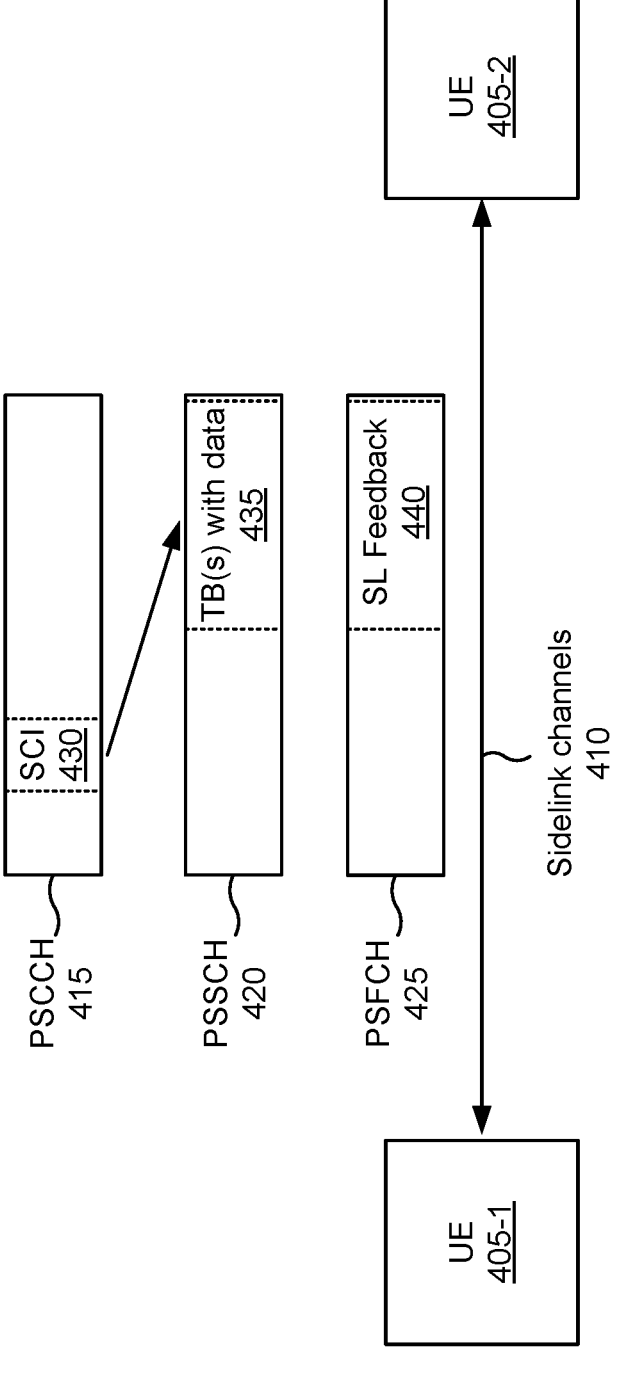
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. In some aspects, the UEs 405 (e.g., UE 405-1 and/or UE 405-2) may correspond to one or more other UEs described elsewhere herein, such as UE 120. Additionally, or alternatively, the first UE 405-1 may correspond to one of the Tx/Rx UE 305 or the Rx/Tx UE 310, and the second UE 405-2 may correspond to the other of the Tx/Rx UE 305 or the Rx/Tx UE 310. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in a radio resource control (RRC) message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

In some aspects, it may be beneficial to perform sidelink communications using an unlicensed radio frequency (RF) spectrum band in order to utilize relatively uncrowded frequencies and/or avoid collisions with other communications. Unlike operation in a licensed RF spectrum band, where a scheduler (e.g., a base station or the like) is in control of the transmission activity in the cell and thus coordinates usage across multiple devices (e.g., multiple UEs or the like), when operating in an unlicensed RF band there may be multiple, uncoordinated users. For example, when operating in an unlicensed RF spectrum band (such as when operating on an unlicensed RF spectrum band in NR, sometimes referred to as NR-U) on the access link (e.g., access link 315 and/or access link 320, as described in connection with FIG. 3), the base station 110 may coordinate communication with one or more UEs 305, 310, by performing various listen-before-talk processes, channel occupancy processes, or the like to ensure that a channel in the NR-U is available before the devices communicate with one another using the unlicensed band.

Moreover, when operating in the NR-U, it may be beneficial to spread a transmission across multiple RBs to satisfy various regulatory requirements or the like. For example, transmissions in the NR-U may be subject to regulatory limits regarding maximum output power, maximum spectral density, or the like. Thus, it may be beneficial to spread out a transmission across a large bandwidth in order to maximize transmit power, and devices may do so by utilizing an interlace waveform to spread a payload across a relatively wide bandwidth. For an interlace waveform, the carrier bandwidth is divided into a number of interlaces (e.g., repeating, noncontiguous RBs), which may be based at least in part on a subcarrier spacing (SCS). For example, for a 15 kHz SCS, ten interlaces may be used, while for a 30 kHz SCS, five interlaces may be used. In such aspects, every tenth RB is part of the same interlace for 15 kHz SCS, and every fifth RB is part of the same interlace for 30 KHz SCS. A payload may be spread across a bandwidth using one or more of these interlaces.

For NR-U, the interlace indices are based on common RBs, and thus are defined relative to a common reference point (referred to as point A). The common reference (e.g., point A) may be indicated to various UEs implementing the NR-U using a remaining minimum system information (RMSI) communication or the like, and resource allocations may be provided to each UE relative to point A. For example, a UE may be provided with a frequency domain resource allocation (FDRA) that includes an X-bit part and a Y-bit part. The X-bit part indicates the scheduled interlace index relative to point A using a 5-bit bitmap for a 30 kHz SCS and a 6-bit code point for 15 kHz SCS. The Y-bit part indicates the scheduled RB set index relative to point A as well as a number of continuous RB sets. The scheduled RBs to be used for a transmission are determined as the intersection of the RBs indicated by the X-bit part and the Y-bit part.

It may be difficult for UEs to communicate on the sidelink in an unlicensed RF spectrum band (sometimes referred to herein as SL-U), particularly when utilizing an interlaced waveform, because the UEs may not be configured with a common reference point (e.g., point A). This is because the distributed UEs may not be in communication with a common base station and/or may not otherwise have received the same RMSI communication defining a common point A. Thus, a transmitting UE (e.g., Tx/Rx UE 305) may not be able to provide a receiving UE (e.g., Rx/Tx US 310) a coherent FDRA reservation, because interlace indices and RB set indices may vary between the transmitting and receiving UEs. As a result, communication in the SL-U is limited, resulting in inefficient network usage and frequency bands leading to decreased throughput, increased latency, and otherwise unreliable sidelink communication.

Some techniques and apparatuses described herein enable the use of a relative FDRA that avoids pre-configuration of interlaces and/or RB sets, permitting UEs to communicate in an interlace waveform using the SL-U even when the UEs are not configured with the same point A or other common reference point. For example, the FDRA may include an X-bit that indicates one or more interlace indices relative to an RB including a PSCCH containing an initial SCI communication (e.g., an SCI-1 communication), and a Y-bit that indicates one or more RB sets relative to an RB set including the PSCCH containing the initial SCI communication. Additionally, or alternatively, the FDRA may include an X-bit that indicates one or more interlace indices relative to a common reference point known to each UE communicating in the sidelink, such as a channel-specific common reference point or the like, and a Y-bit that indicates one or more RB sets relative to a common reference point set known to each UE. As a result, UEs may utilize an FDRA even when the UEs are not configured with the same point A, thus enabling efficient interlace waveform communication in the SL-U and resulting in efficient network usage, increased throughput, decreased latency, and otherwise reliable sidelink communication.

As indicated above, FIG. 4 is provided as an example. Other examples may differ from what is described with respect to FIG. 4.

Figure 5:
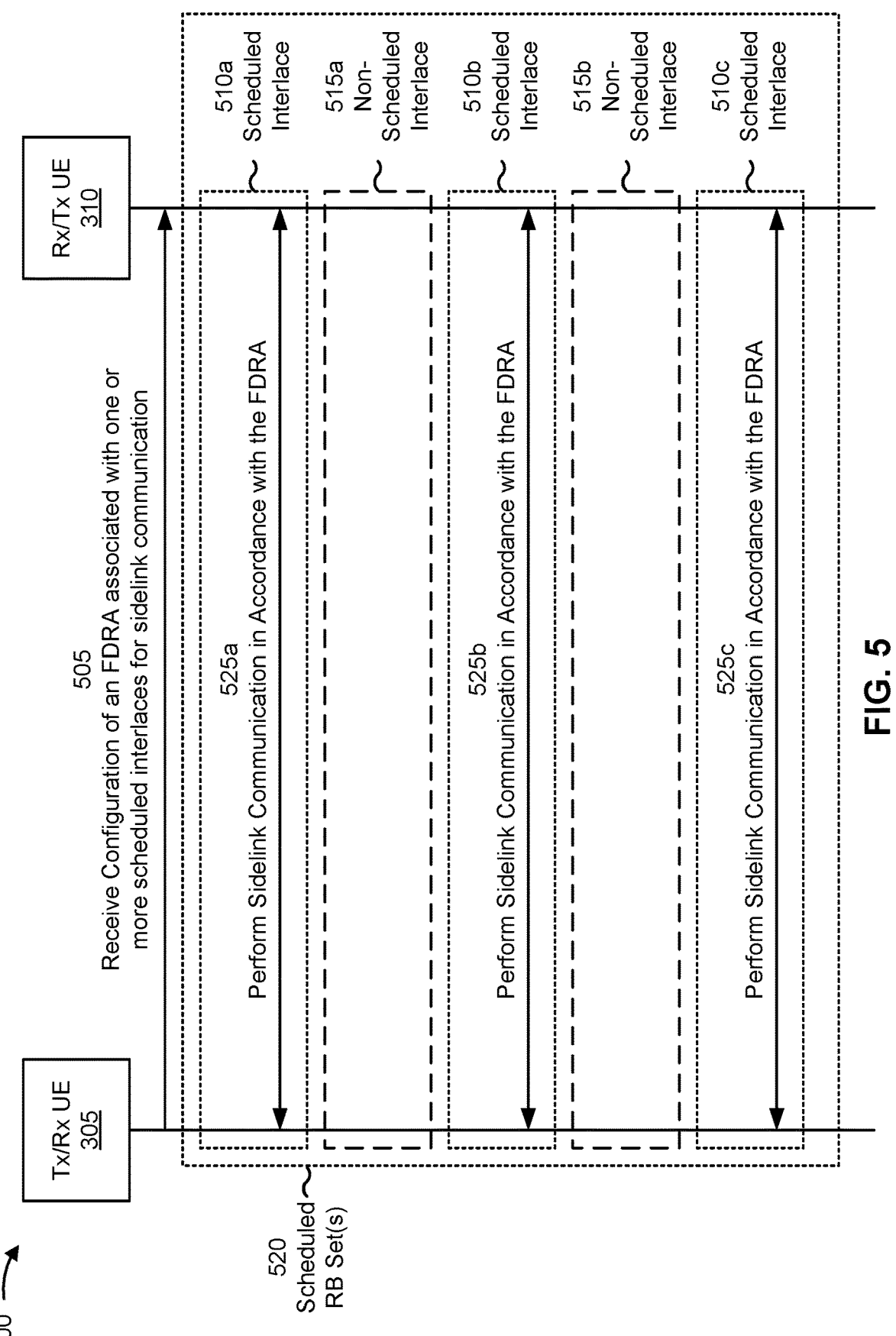
FIG. 5 is a diagram illustrating an example associated with a frequency domain resource allocation (FDRA) for sidelink interlaced waveforms, in accordance with the present disclosure.

FIG. 5 is a diagram illustrating an example 500 associated with an FDRA for sidelink interlaced waveforms, in accordance with the present disclosure. As shown in FIG. 5, a first UE (e.g., a Tx/Rx UE 305) and a second UE (e.g., a Rx/Tx UE 310) may communicate with one another via a sidelink.

As shown by reference number 505, a UE 310 may receive from another UE 305 a configuration of an FDRA associated with one or more scheduled interlaces for sidelink communication. In some aspects, the FDRA is based at least in part on (e.g., is defined relative to) an RB known to both UEs 305, 310. For example, as described in further detail in connection with FIG. 6, the FDRA may be based at least in part on an RB associated with an SCI-1 communication. That is, the FDRA may indicate one or more interlaces scheduled for sidelink communication relative to an interlace in which the SCI-1 communication is transmitted, and/or the FDRA may indicate one or more RB sets scheduled for sidelink communication relative to an RB set in which the SCI-1 communication is transmitted. Additionally, or alternatively, the FDRA may be based at least in part on a common reference point (sometimes referred to as a point A) known to both UEs 305, 310 (e.g., hard coded at both UEs 305, 310). In some aspects, the common reference point may be a channel-specific common reference point (e.g., a first common reference point is defined for a first channel or a first group of channels, a second common reference point is defined for a second channel or a second group of channels, and so forth). In some other aspects, the common reference point may be configured to be within a point A grid, with the point A grid (sometimes referred to as a common reference point grid) being defined by the product of the RB size of the frequency band being utilized for sidelink communication and the number of interlaces available for sidelink communication. For example, sidelink communications occurring in a frequency band having a 15 kHz SCS with ten available interlaces for sidelink communication may have a point A grid of ten RBs, which equals a bandwidth of 1.8 MHz, with the common reference point (e.g., point A) being placed on the 1.8 MHz grid. Similarly, sidelink communications occurring in a frequency band having a 30 kHz SCS with five interlaces available for sidelink communication may have a point A grid of five RBs, which equals a bandwidth of 1.8 MHz, with the common reference point (e.g., point A) being placed on the 1.8 MHz grid. These features are described in more detail in connection with FIG. 6.

The FDRA may include an interlace indication (sometimes referred to as an X-bit indication) and/or an RB set indication (sometimes referred to as a Y-bit indication). In some aspects, the interlace indication may indicate the one or more scheduled interlaces for the sidelink communication and/or the RB set indication may indicate one or more scheduled RB sets for the sidelink communication. For example, the frequency band or frequency bands being utilized for sidelink communication (which may be unlicensed bands, or SL-U, as described) may include a number of interlaces, such as scheduled interlaces 510 and non-scheduled interlaces 515. The FDRA may thus indicate which interlaces should be utilized for sidelink communication (e.g., the scheduled interlaces 510), and, by extension, which interlaces should not be used for sidelink communication (e.g., the non-scheduled interlaces 515). The RB set indication may indicate a contiguous number of RB sets for performing sidelink communication. For example, in the aspect depicted in FIG. 5, there is one scheduled RB set 520, but in some other aspects more or fewer RB sets may be scheduled without departing from the scope of the disclosure. The resources allocated for sidelink communication are the scheduled interlaces within each scheduled RB set. The interlace indication and RB set indication is described in more detail in connection with FIG. 6.

As indicated by reference number 525, the UEs 305, 310 may perform sidelink communication in accordance with the FDRA. For example, as indicated by reference number 525a, a first communication may be performed within a first scheduled interlace 510a, while no communications are performed within a first non-scheduled interlace 515a. Similarly, as indicated by reference numbers 525b and 525c, respectively, a second and a third communication may be performed within a second scheduled interlace 510b and a third scheduled interlace 510c, respectively, while no communications are performed within a second non-scheduled interlace 515b. In this way, a sidelink communication may be spread across a wider bandwidth, making more efficient use of unlicensed spectra for sidelink communications.

As indicated above, FIG. 5 is provided as an example. Other examples may differ from what is described with respect to FIG. 5.

Figure 6:
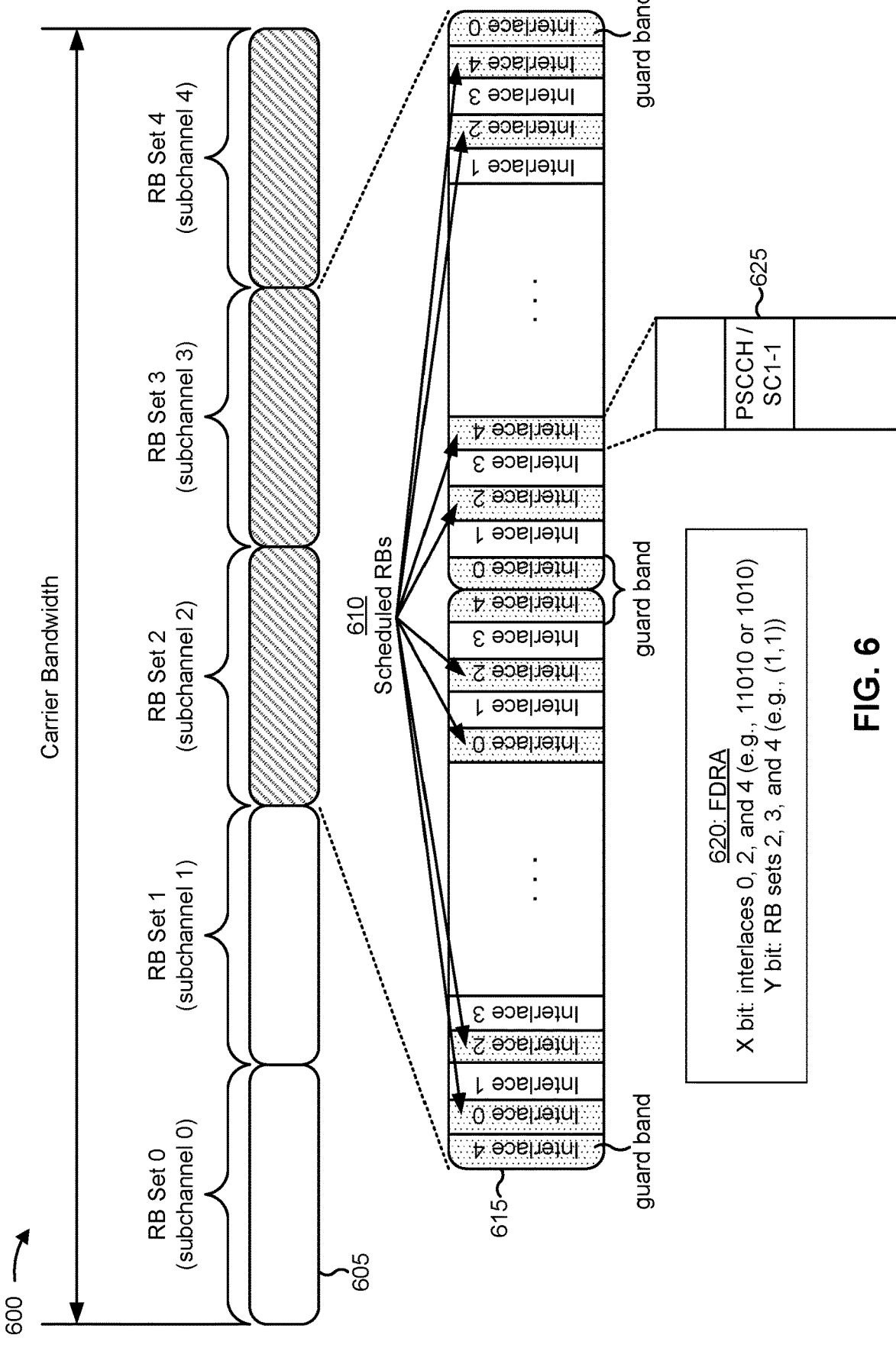
FIG. 6 is a diagram illustrating an example of scheduled resource blocks in accordance with a sidelink FDRA, in accordance with the present disclosure.

FIG. 6 is a diagram illustrating an example 600 of scheduled RBs in accordance with a sidelink FDRA, in accordance with the present disclosure.

As shown by reference number 605, a carrier bandwidth (sometimes referred to as a channel) is divided into a number of RB sets or subchannels. In the depicted example, the carrier bandwidth includes five RB sets (indexed as RB set 0, RB set 1, RB set 2, RB set 3, and RB set 4), but in other aspects, the carrier bandwidth may include more or less RB sets without departing from the scope of the disclosure. For example, in some aspects, the carrier bandwidth may be 80 MHz, and may include four, 20 MHz RB sets or subchannels. In some other aspects, the carrier bandwidth may be 100 MHz, and may include five, 20 MHz RB sets or subchannels.

As indicated by reference number 610, less than all of the RBs of the carrier bandwidth are scheduled for sidelink communication. That is, only RBs indicated by an FDRA (such as the FDRA described in connection with reference number 505) may be scheduled for sidelink communication. Moreover, not all of the RBs scheduled for sidelink communication are contiguous. This is because the FDRA of the example 600 shown in FIG. 6 utilizes the interlaced waveform, such that the sidelink communication is spread over a wider bandwidth than if the scheduled RBs were contiguous. Moreover, in some aspects, one or more RBs of each RB set may be associated with a guard band, and thus these RBs may not be available for purposes of transmitting a sidelink communication. In such aspects, the interlaces within the guard band may not form a part of the scheduled RBs, even if they correspond to one of the scheduled interlaces. For example, in FIG. 6, the guard bands include RBs associated with interlaces 0 and 4, which are scheduled interlaces as indicated by the FDRA. However, the RBs within each guard band may not be considered part of the scheduled RBs (as shown by reference number 610) because those RBs are not permitted to carry a sidelink communication.

For ease of description of the FDRA, two of the RB sets (e.g., RB set 2 and RB set 3) of the carrier bandwidth are shown in an exploded view in FIG. 6, indicated by reference number 615. As may be best understood with reference to the exploded view shown at reference number 615, each RB set includes a number of RBs, with each RB being associated with one of a number (e.g., M) of interlaces. In the depicted example, the carrier bandwidth is divided into five interlaces (e.g., M=5), indexed from interlace 0 to interlace 4. In such aspects, every fifth RB belongs to the same interlace. The number of RBs within each RB set and associated with a particular interlace may vary according to certain configurations such as an RB set guard band configuration. More particularly, depending on the RB set guard band configuration, each RB set may include nine, ten, or eleven RBs associated with each interlace. For ease of description, only the first and last RB of each interlace in each of RB sets 2 and 3 are depicted in FIG. 6.

Moreover, although five interlaces are shown for purposes of description, aspects of the disclosure are not so limited, and in other aspects more or less interlaces may be employed without departing from the scope of the disclosure. For example, for frequency bands with a 15 kHz SCS, ten interlaces may be used, while for a frequency band with 30 kHz SCS, five interlaces may be used (such as is depicted in FIG. 6). In such aspects, every tenth RB is part of the same interlace for 15 kHz SCS, and every fifth RB is part of the same interlace for 30 kHz SCS. Any other number of interlaces (e.g., any other value of M) may be employed without departing from the scope of the disclosure.

In some aspects, an FDRA, such as the FDRA described in connection with reference number 505, may include an interlace indication indicating one or more scheduled interlaces for the sidelink communication and/or an RB set indication indicating one or more scheduled RB sets for the sidelink communication. For example, as indicated by reference number 620, the interlace indication of the FDRA (e.g., the X-bit indication) indicates that interlaces 0, 2, and 4 may be used for sidelink communication, which are shown using stippling in FIG. 6, and the RB set indication of the FDRA (e.g., the Y-bit indication) indicates that RB sets 2, 3, and 4 may be used for sidelink communication, which are shown using hatching in FIG. 6. The resulting resource allocation includes the intersection of these two indications (e.g., RBs of interlaces 0, 2, and 4 that are also within RB sets 2, 3, and 4).

In some aspects, an FDRA may indicate which interlaces and which RB sets to use for sidelink communication relative to an interlace and/or an RB set known to both UEs (e.g., known to both Tx/Rx UE 305 and Rx/Tx UE 310). For example, the interlace indication of the FDRA may indicate interlaces to use for sidelink communication relative to an interlace associated with an RB used to transmit an SCI-1 communication. More particularly, as indicated by reference number 625, a PSCCH containing an SCI-1 communication may be transmitted in an RB associated with interlace 4. Thus, the interlace indication of the FDRA may indicate interlaces to be used for sidelink communication relative to interlace 4.

In some aspects (e.g., for 30 kHz SCS aspects including five interlaces), the interlace indication may be a 4-bit or 5-bit bitmap. In such aspects, the bitmap may indicate scheduled interlaces using an information bit "1" and may indicate a non-scheduled interlace using an information bit "0" relative to the interlace including the SCI-1 communication. More particularly, for aspects in which a 5-bit bitmap is employed, the first bit of the bitmap may correspond to the interlace including the SCI-1 communication, and thus a bitmap of 11010 indicates that the current interlace (e.g., the interlace containing the PSCCH and/or SCI-1 communication) may be used for sidelink communication (corresponding to the first information bit 1), and that the interlaces occurring one and three interlaces after the current interlace may be used for sidelink communication (corresponding to the second and third information bits 1, respectively). In the depicted example, this corresponds to interlace 4, interlace 0, and interlace 2, as shown using stippling. The information bits 0 indicate that the second and fourth interlace following the current interlace (e.g., interlaces 1 and 3 in the depicted example) are non-scheduled interlaces and thus should not be used for sidelink communication. For aspects in which a 4-bit bitmap is employed, the UEs 305, 310 may always assume that the current interlace may be used for sidelink communication (e.g., the interlace including the PSCCH and/or SCI-1 communication will be assumed to form part of the resource allocation), and thus the bits will map to the four interlaces following the current interlace (e.g., the first bit in the bitmap may correspond to the interlace immediately following the interlace including the SCI-1 communication). Thus, for the depicted example, a 4-bit bitmap of 1010 would indicate that the scheduled interlaces are interlace 4 (because that is the interlace in which the PSCCH and/or SCI-1 communication was received) as well as interlace 0 (corresponding to the first information bit 1 in the bitmap) and interlace 2 (corresponding to the second information bit 1 in the bitmap).

In some aspects, the interlace indication may indicate a resource indicator value (RIV) (which may also be referred to as a code point) instead of a bitmap. An RIV (e.g., a code point) corresponds to a known and unique interlace pattern that may be used for sidelink communication. Put another way, the UEs may be hard-coded or configured with an index including various interlace patterns, each associated with a unique RIV, and the UEs may signal to one another a particular interlace pattern from the index to be utilized by including the corresponding RIV in the interlace indication of the FDRA. It may be beneficial to implement an RIV or similar code point when more than five interlaces are used, such as for carrier bandwidths associated with a 15 kHz SCS utilizing ten interlaces, in order to reduce signaling overhead. More particularly, rather than implementing a ten-bit bitmap to indicate the scheduled interlaces, the RIV or similar code point may be indicated using fewer bits. Generally, a given number of bits, n, may signal $2^n$ unique code points. Thus, using four bits, the interlace condition could indicate up to 16 (e.g., $2^4$) distinct interlace patterns to be used for sidelink communication.

As with the four-bit or five-bit bitmap described above, the RIV may indicate which interlaces may be used for sidelink communication relative to the interlace containing the PSCCH and/or SCI-1 communication. For example, in some aspects a four-bit RIV may be used to indicate one of 14 different combinations of scheduled interlaces to be used for sidelink communication. These combinations of scheduled interlaces may include one to ten contiguous interlaces (e.g., RIV values corresponding to scheduling interlaces {0}, {0,1}, {0,1,2}, {0, 1,2,3}, {0,1,2,3,4}, {0, 1,2,3,4,5}, {0,1,2,3,4,5,6}, {0,1,2,3,4,5,6,7}, {0,1,2,3,4,5,6,7,8}, and {0,1,2,3,4,5,6,7,8,9}, where the first interlace (e.g., the interlace indexed as 0) corresponds to the interlace in which the PSCCH and/or SCI-1 communication is communicated), as well as four non-contiguous interlace combinations (e.g., {0,5}, {0,1,5,6}, {0, 1,2,5,6,7}, and {0,1,2,3,5,6,7,8}). These combinations of scheduled interlaces are provided merely as examples, and in some other aspects the RIV may contain more or fewer than four bits and/or may point to more or fewer than the 14 combinations of scheduled interlaces described above. Thus, the interlace indication of the FDRA could indicate an RIV corresponding to one of the interlace patterns described above, and the receiving UE would interpret the pattern as being relative to the interlace including the RB associated with the SCI-1 communication (e.g., the "0" interlace of the above described interlace patterns is mapped to the interlace including the SCI-1 communication).

The FDRA may also indicate which RB sets to use for sidelink communication relative to an RB set associated with the SCI-1 communication. More particularly, the FDRA may include an RB set indication (e.g., a Y-bit indication) that indicates one or more scheduled RB sets for the sidelink communication. In some aspects, the RB set indication may indicate a first group of zero or more contiguous RB sets associated with frequencies higher than a frequency band associated with the RB set associated with the SCI-1 communication, and the RB set indication may further indicate a second group of zero or more contiguous RB sets associated with frequencies lower than the frequency band of the RB set associated with the SCI-1 communication. In such aspects, the scheduled RB sets include the first group of zero or more contiguous RB sets, the RB set associated with the SCI-1 communication, and the second group of zero or more contiguous RB sets. For example, in FIG. 6, the PSCCH containing the SCI-1 communication, indicated at reference number 625, is received within the fourth RB set (indexed as RB set 3). In this aspect, the RB set indication may indicate that one RB set associated with frequencies higher than the frequency band associated with the RB set associated with the SCI-1 communication (e.g., RB set 4) is scheduled for sidelink communication, and that one RB set associated with frequencies lower than the frequency band associated with the RB set associated with the SCI-1 communication are scheduled for sidelink communication (e.g., RB set 2). Thus, the scheduled RB sets would include the RB set associated with the SCI-1 communication (e.g., RB set 1) as well as the additionally indicated RB sets (e.g., RB sets 2 and 4).

More generally, the RB set indicator may be a code point or similar indicator indicating (L, H) RB sets that are scheduled for sidelink communication in addition to the RB set associated with the SCI-1 communication, where/is a number of contiguous RB sets having frequencies lower than the RB set associated with the SCI-1 communication, and where H is a number of contiguous RB sets having frequencies higher than the RB set associated with the SCI-1 communication. For carrier bandwidths having a bandwidth of 80 MHz composed of four RB sets or subchannels, a four-bit RB set indication (e.g., a four-bit code point), which may indicate up to 16 distinct combinations of RB sets (e.g., $2^4$=16), may be used to indicate one of the following ten (L, H) combinations of scheduled RB sets: (0,0) (e.g., only the RB set associated with the SCI-1 communication is scheduled for sidelink communication), (0,1), (1,0), (0,2), (1,1), (2,0), (0,3), (1,2), (2,1), or (3,0). Similarly, for bandwidth parts having a bandwidth of 100 MHz composed of five RB sets or subchannels, a four-bit RB set indication (e.g., a four-bit code point), which may indicate up to 16 distinct combinations of RB sets, may be used to indicate 15 combinations of scheduled RB sets, which include, in addition to the above described ten combinations, the following (L, H) combinations of RB sets: (0,4), (1,3), (2,2), (3,1), or (4,0). In the example depicted in FIG. 6, the RB set indication may indicate that the scheduled RB sets are (1,1) (e.g., one RB set higher than the RB set associated with the SCI-1 communication (e.g., RB set 4) and one RB set lower than the RB set associated with the SCI-1 communication (e.g., RB set 2), in addition to the RB set associated with SCI-1 communication (e.g., RB set 3)).

In some aspects, the RB set indication may be limited to scheduling only RB sets having frequency bands higher than the frequency band of the RB set associated with the SCI-1 communication. Put another way, the SCI-1 communication may be limited to being transmitted in the lowest frequency RB set in the allocation. In such aspects, the RB set indication only needs to indicate a number of contiguous RB sets having frequencies above the frequency band of the RB set associated with the SCI-1 communication. For 80 MHz channels composed of four 20 MHz subchannels, the RB set indication may thus indicate one of four combinations of RB sets scheduled for sidelink communication: 0, 1, 2, or 3 RB sets associated with frequencies above the frequency band of the RB set associated with the SCI-1 communication. For 100 MHz channels composed of five 20 MHz subchannels, the RB set indication may thus indicate one of five combinations of RB sets scheduled for sidelink communication: 0, 1, 2, 3, or 4 RB sets associated with frequencies above the frequency band of the RB set associated with the SCI-1 communication. In such aspects, the RB set indication may thus be at least two bits for 80 MHz implementations (which can point to up to $2^2$=4 combinations of RB sets), or three bits for 100 MHz implementations (which can point to up to $2^3=8$ combinations of RB sets).

Although in the above described examples the scheduled interlaces and the scheduled RB sets are described as being indicated relative to an RB and/or an RB set used to send an initial PSCCH communication (e.g., the scheduled interlaces are indicated relative to an RB including the SCI-1 communication and the scheduled RB sets are indicated relative to an RB set including the SCI-1 communication), aspects of the disclosure are not so limited. In some other aspects, the scheduled interlaces and/or the scheduled RB sets may be indicated relative to a common reference point known to both UEs communicating on the sidelink, sometimes referred to as a point A. For example, each UE may be hard-coded or configured with one or more common reference points (e.g., one or more point As), and the bitmaps and/or code points described above may indicate the scheduled interlaces relative to an interlace including the common reference point and/or may indicate the scheduled RB sets relative to an RB set including the common reference point.

In some aspects, the common reference point, or else multiple common reference points, may be hard coded at each UE and may be channel-specific. For example, each UE may be hard coded with a common reference point for each channel (e.g., each UE may be hard coded with one common reference point for each 80 MHz or 100 MHz channel) or for a set of adjacent channels (e.g., each UE may be hard coded with one common reference point for each group of 80 MHz or 100 MHz channels of multiple groups of channels). Accordingly, when a UE receives a communication from another UE including an FDRA (e.g., an SCI-1 communication or the like), the UE may interpret the FDRA as being relative to the common reference point associated with the channel in which the SCI-1 communication or similar communication was received.

Additionally, or alternatively, in some aspects the common reference point may be located within a grid (sometimes referred to herein as a point A grid) defined by a multiple of an RB size and a number of interlaces available for sidelink communication. For example, sidelink communications occurring in a frequency band having a 15 kHz SCS with ten available interlaces for sidelink communication may correspond to a point A grid of ten RBs, which equals a bandwidth of 1.8 MHz (e.g., RB size (e.g., 15 kHz*12 subcarriers=180 kHz)*number of interlaces (e.g., 10)=1.8 MHz), with the common reference point (e.g., point A) being placed on the 1.8 MHz grid. Similarly, sidelink communications occurring in a frequency band having a 30 kHz SCS with five interlaces available for sidelink communication may correspond to a point A grid of five RBs, which equals a bandwidth of 1.8 MHz (e.g., RB size (30 kHz*12 subcarriers=360 kHz)*number of interlaces (e.g., 5)=1.8 MHz), with the common reference point (e.g., point A) being placed on the 1.8 MHz grid.

In some aspects, the FDRA may further indicate one or more reserved interlaces for future sidelink communication and/or one or more reserved RB sets for future sidelink communication. For example, the interlace indication may indicate that the same or different interlaces are reserved for the future sidelink communications, and, similarly, the RB set indication may indicate that the same or different RB sets are reserved for the future sidelink communications. In some aspects, when the same interlaces and/or the same RB sets are to be used for the future sidelink communications, the FDRA may not need to signal any additional information, and the UE will interpret the initial FDRA as being applicable to the future communications as well (e.g., the UE will use the initial FDRA during future communications).

In some other aspects, however, the FDRA may include additional indications that may be used to signal an interlace offset parameter with respect to the interlaces originally scheduled by the FDRA. For example, in some aspects interlaces reserved for the future sidelink communication may follow the original interlace pattern (e.g., may follow the same pattern of scheduled and non-scheduled interlaces as indicated by the FDRA) but may be offset from the originally scheduled interlaces. The offset may be signaled relative to the interlace associated with the SCI-1 communication and/or the common reference point. In some aspects, the offset is signaled using additional bits in the FDRA, and more particularly by using $[Y*\log_2(M)]$ additional bits, wherein Y is the number of future reservations being made in the FDRA and where M is the number of interlaces for the particular frequency band. Thus, for 30 kHz SCS aspects using five total interlaces, the additional bits used to signal future reservation offsets would be $[1*\log_2(5)]$ for one reservation, or 3 additional bits (e.g., $[1*2.322]=3$), and $[2*\log_2(5)]$ for two reservations, or 5 additional bits (e.g., $[2*2.322]=[4.644]=5$). Returning to the above examples of interlace indications that used 4-bit or 5-bit bitmaps to indicate the scheduled interlaces, the total bits used to indicate the scheduled interlaces with future reservations would thus be 7 or 8 bits, respectively, for one future reservation, and 9 or 10 bits, respectively, for two future reservations. Similarly, for 15 kHz SCS aspects using ten total interlaces, the additional bits used to signal future reservation offsets would be $[1*\log_2(10)]$ for one reservation, or 4 additional bits (e.g., $[1*3.322]=4$), and $[2*\log_2(10)]$ for two reservations, or 7 additional bits (e.g., $[2*3.322]=[6.644]=7$). Returning to the above examples of interlace indications that used a four-bit RIV or similar code point to indicate the scheduled interlaces, the total bits used to indicate the scheduled interlaces with future reservations would thus be 8 bits for one future reservation, and 11 bits for two future reservations.

In some aspects, the signaling overhead used for future reservations may be reduced by limiting the initial interlace allocation to only contiguous interlaces. This is because in such aspects joint encoding of the initial interlace assignment and future reservation offsets is possible. More particularly, for N=Y+1 allocations (i.e., the original interlace allocation as well as Y future allocations), the interlace indication may need to signal $(M-L)^Y$ offsets. In such aspects, the interlace may need $$\left\lceil \log_2\left(M*\frac{M+1}{2}\right)\right\rceil \text{ total bits}$$

for N=2 (e.g., one future reservation) and $$\left\lceil \log_2\left(\frac{M(M+1)(2M+1)}{6}\right)\right\rceil \text{ total bits}$$

for N=3 (e.g., two future reservations). For 30 kHz SCS aspects with 5 interlaces, the interlace indication may thus need $$\left\lceil \log_2\left(5*\frac{5+1}{2}\right)\right\rceil = \lceil\log_2(15)\rceil = \lceil 3.907\rceil = \text{four total bits}$$

for indicating the scheduled interlaces with one future reservation, and may need $$\left\lceil \log_2\left(\frac{5(5+1)(2*5+1)}{6}\right)\right\rceil = \lceil \log_2(55)\rceil = \lceil 5.781\rceil = \text{six total bits}$$

for indicating the scheduled interlaces with two future reservations. For 15 kHz SCS aspects implementing ten total interlaces, the FDRA may need $$\left\lceil \log_2\left(10*\frac{10+1}{2}\right)\right\rceil = \lceil \log_2(55)\rceil = \lceil 5.781\rceil = \text{six total bits}$$

for indicating the scheduled interlaces with one future reservation, and may need $$\left\lceil \log_2\left(\frac{10(10+1)(2*10+1)}{6}\right)\right\rceil = \lceil \log_2(385)\rceil = \lceil 8.589\rceil = 9 \text{ total bits}$$

for indicating the scheduled interlaces with two future reservations.

Similarly, when limiting the initial RB set allocation to only contiguous interlaces, the RB set indication of the FDRA may be jointly encoded to indicate a number of contiguous RB sets from the RB set containing the SCI-1 communication for the initial allocation as well as offsets for future RB sets reservations. More particularly, for N=Y+1 allocations in a frequency band having K RB sets (e.g., K 20 MHz subchannels), the RB set indication may need $$\left\lceil \log_2\left(K*\frac{K+1}{2}\right)\right\rceil \text{ total bits}$$

indicate the initial RB set allocation and one future reservation, and may need $$\left\lceil \log_2\left(\frac{K(K+1)(2K+1)}{6}\right)\right\rceil \text{ total bits}$$

to indicate the initial RB set allocation and two future reservations. For 80 MHz frequency bands having four RB sets, the RB set indication may thus need $$\left\lceil \log_2\left(4*\frac{4+1}{2}\right)\right\rceil = \lceil \log_2(10)\rceil = \lceil 3.322\rceil = \text{four total bits}$$

for indicating the scheduled RB sets and one future RB set reservation, and may need $$\left\lceil \log_2\left(\frac{4(4+1)(2*4+1)}{2}\right)\right\rceil = \lceil \log_2(30)\rceil = \lceil 4.907\rceil = \text{five total bits}$$

for indicating the scheduled RB sets and two future RB set reservations. For 100 MHz frequency bands having five RB sets, the RB set indication may thus need $$\left\lceil \log_2\left(5*\frac{5+1}{2}\right)\right\rceil = \lceil \log_2(15)\rceil = \lceil 3.907\rceil = \text{four total bits}$$

for indicating the scheduled RB sets and one future RB set reservation, and may need $$\left\lceil \log_2\left(\frac{5(5+1)(2*5+1)}{6}\right)\right\rceil = \lceil \log_2(55)\rceil = \lceil 5.781\rceil = \text{six total bits}$$

for indicating the scheduled RB sets and one future RB set reservation.

In some aspects, the UEs may be communicating in a frequency band that does not include an RB set grid and/or that does not include K defined RB sets. In such aspects, a positive or negative offset parameter relative to the RB set including the SCI-1 communication may be indicated using the RB set indication of the FDRA. For example, in the case of an 80 MHz frequency band, if there is one RB set for the initial assignment, the RB set indication may need to indicate $7^Y$ offsets (e.g., $\{3,2,1,0,-1,-2,-3\}^Y$. More broadly, for X RB sets in the initial assignment, the RB set indication may need to signal $((4-X)*2+1)^Y$ offsets, with X being 1, 2, 3, or 4. Thus, the total number of code points needed to signal all possible offsets for one future reservation is the sum of the $((4-X)*2+1)^Y$ across all possible X values, or 16 code points (e.g., $((4-1)*2+1)^1+((4-2)*2+1)^1+((4-3)*2+1)^1+((4-4)*2+1)^*=7+5+3+1=16)$. Therefore, the RB set may need an additional four bits to signal all code points (e.g., $[\log_2(16)]=4$). Similarly, the total number of code points needed to signal all possible offsets for two future reservation is 84 code points (e.g., $((4-1)*2+1)^2+((4-2)*2+1)^2+((4-3)*2+1)^2+((4-4)*2+1)^1=49+25+9+1=84)$. Thus, the RB set may need an additional seven bits to signal all code points (e.g., $[\log_2(84)]=7$).

In the case of a 100 MHz frequency band, for X RB sets in the initial assignment, the RB set indication may need to signal $((5-X)*2+1)^Y$ offsets, with X being 1, 2, 3, 4, or 5. Thus, the total number of code points needed to signal all possible offsets for one future reservation is the sum of $((5-X)*2+1)^Y$ across all possible X values, or 25 code points (e.g., $((5-1)*2+1)^1+((5-2)*2+1)^1+((5-3)*2+1)^1+((5-4)*2+1)^1+((5-5)*2+1)^1=9+7+5+3+1=25)$. Therefore, the RB set may need an additional five bits to signal all code points (e.g., $[\log_2(25)]=5$). Similarly, the total number of code points needed to signal all possible offsets for two future reservation is 165 code points (e.g., $((5-1)*2+1)^2+((5-2)*2+1)^2+((5-3)*2+1)^2+((5-4)*2+1)^2+((5-5)*2+1)^2=81+49+25+9+1=165)$. Thus, the RB set may need an additional eight bits to signal all code points (e.g., $[\log_2(165)]=8$).

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120) performs operations associated with FDRA for sidelink interlaced waveforms.

As shown in FIG. 7, in some aspects, process 700 may include receiving a configuration of an FDRA associated with one or more scheduled interlaces for sidelink communication, wherein the FDRA is based at least in part on an RB associated with a SCI-1 communication (block 710). For example, the UE (e.g., using communication manager 140 and/or reception component 902, depicted in FIG. 9) may receive a configuration of an FDRA associated with one or more scheduled interlaces for sidelink communication, wherein the FDRA is based at least in part on an RB associated with a SCI-1 communication, as described above.

As further shown in FIG. 7, in some aspects, process 700 may include performing the sidelink communication in accordance with the FDRA (block 720). For example, the UE (e.g., using communication manager 140 and/or performance component 908, depicted in FIG. 9) may perform the sidelink communication in accordance with the FDRA, as described above.

Process 700 may include additional aspects, such as any single aspect or any combination of aspects described below and/or in connection with one or more other processes described elsewhere herein.

In a first aspect, the FDRA includes an interlace indication indicating the one or more scheduled interlaces, and the FDRA includes an RB set indication indicating one or more scheduled RB sets for the sidelink communication.

In a second aspect, alone or in combination with the first aspect, the interlace indication indicates the one or more scheduled interlaces using a bitmap, and the bitmap indicates the one or more scheduled interlaces relative to the RB associated with the SCI-1 communication.

In a third aspect, alone or in combination with one or more of the first and second aspects, the interlace indication indicates the one or more scheduled interlaces using an RIV, and the RIV indicates the one or more scheduled interlaces relative to the RB associated with the SCI-1 communication.

In a fourth aspect, alone or in combination with one or more of the first through third aspects, the interlace indication further indicates one or more reserved interlaces for future sidelink communication.

In a fifth aspect, alone or in combination with one or more of the first through fourth aspects, the one or more reserved interlaces are the one or more scheduled interlaces.

In a sixth aspect, alone or in combination with one or more of the first through fifth aspects, the one or more reserved interlaces are different one or more interlaces than the one or more scheduled interlaces, and the interlace indication further indicates an interlace offset parameter indicating an offset of the one or more reserved interlaces with respect to the one or more scheduled interlaces.

In a seventh aspect, alone or in combination with one or more of the first through sixth aspects, the RB set indication indicates the one or more scheduled RB sets relative to an RB set associated with the SCI-1 communication.

In an eighth aspect, alone or in combination with one or more of the first through seventh aspects, the RB set indication indicates a first group of zero or more contiguous RB sets associated with frequencies higher than a frequency band associated with the RB set associated with the SCI-1 communication, the RB set indication indicates a second group of zero or more contiguous RB sets associated with frequencies lower than the frequency band of the RB set associated with the SCI-1 communication, and the one or more scheduled RB sets include the first group of zero or more contiguous RB sets, the RB set associated with the SCI-1 communication, and the second group of zero or more contiguous RB sets.

In a ninth aspect, alone or in combination with one or more of the first through eighth aspects, the RB set indication indicates a group of zero or more contiguous RB sets associated with frequencies higher than a frequency band associated with the RB set associated with the SCI-1 communication, and the one or more scheduled RB sets include the group of zero or more contiguous RB sets and the RB set associated with the SCI-1 communication.

In a tenth aspect, alone or in combination with one or more of the first through ninth aspects, the RB set indication further indicates one or more reserved RB sets for future sidelink communication.

In an eleventh aspect, alone or in combination with one or more of the first through tenth aspects, the one or more reserved RB sets are the one or more scheduled RB sets.

In a twelfth aspect, alone or in combination with one or more of the first through eleventh aspects, the one or more reserved RB sets are different one or more RB sets than the one or more scheduled RB sets, and the RB set indication further indicates an RB set offset parameter indicating an offset of the one or more reserved RB sets with respect to the one or more scheduled RB sets.

In a thirteenth aspect, alone or in combination with one or more of the first through twelfth aspects, the one or more reserved RB sets are different one or more RB sets than the one or more scheduled RB sets, and the RB set indication further indicates an RB set offset parameter indicating an offset of the one or more reserved RB sets with respect to the RB set associated with the SCI-1 communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
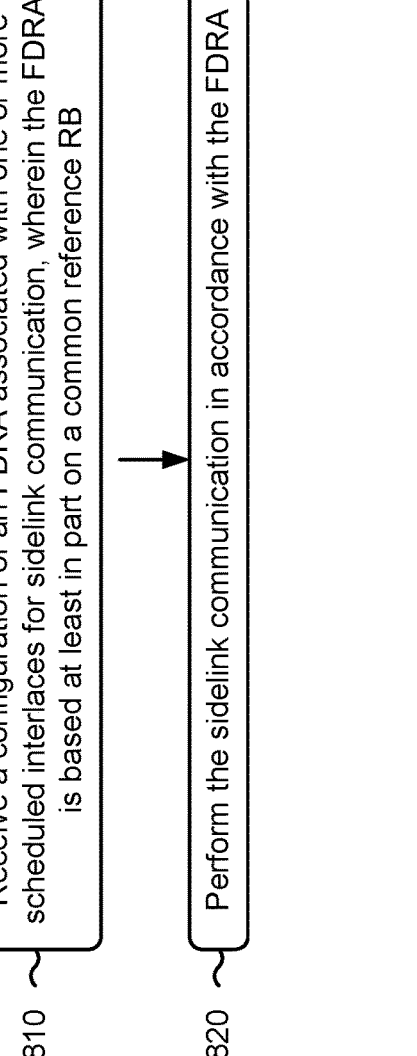
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with FDRA for sidelink interlaced waveforms.

As shown in FIG. 8, in some aspects, process 800 may include receiving a configuration of an FDRA associated with one or more scheduled interlaces for sidelink communication, wherein the FDRA is based at least in part on a common reference point (block 810). For example, the UE (e.g., using communication manager 140 and/or reception component 902, depicted in FIG. 9) may receive a configuration of an FDRA associated with one or more scheduled interlaces for sidelink communication, wherein the FDRA is based at least in part on a common reference point, as described above.

As further shown in FIG. 8, in some aspects, process 800 may include performing the sidelink communication in accordance with the FDRA (block 820). For example, the UE (e.g., using communication manager 140 and/or performance component 908, depicted in FIG. 9) may perform the sidelink communication in accordance with the FDRA, as described above.

Process 800 may include additional aspects, such as any single aspect or any combination of aspects described below and/or in connection with one or more other processes described elsewhere herein.

In a first aspect, the common reference point is based at least in part on a channel in which the sidelink communication is performed.

In a second aspect, alone or in combination with the first aspect, the common reference point is based at least in part on an RB size and a number of interlaces available for sidelink communication.

In a third aspect, alone or in combination with one or more of the first and second aspects, the common reference point is within a common reference point grid, and a size of the common reference point grid is a product of the RB size and the number of interlaces available for sidelink communication.

In a fourth aspect, alone or in combination with one or more of the first through third aspects, the FDRA includes an interlace indication indicating the one or more scheduled interlaces, and the FDRA includes an RB set indication indicating one or more scheduled RB sets for sidelink communication.

In a fifth aspect, alone or in combination with one or more of the first through fourth aspects, the interlace indication further indicates one or more reserved interlaces for future sidelink communication.

In a sixth aspect, alone or in combination with one or more of the first through fifth aspects, the one or more reserved interlaces are the one or more scheduled interlaces.

In a seventh aspect, alone or in combination with one or more of the first through sixth aspects, the one or more reserved interlaces are different one or more interlaces than the one or more scheduled interlaces, and the interlace indication further indicates an interlace offset parameter indicating an offset of the one or more reserved interlaces with respect to the one or more scheduled interlaces.

In an eighth aspect, alone or in combination with one or more of the first through seventh aspects, the RB set indication further indicates one or more reserved RB sets for future sidelink communication.

In a ninth aspect, alone or in combination with one or more of the first through eighth aspects, the one or more reserved RB sets are the one or more scheduled RB sets.

In a tenth aspect, alone or in combination with one or more of the first through ninth aspects, the one or more reserved RB sets are different one or more RB sets than the one or more scheduled RB sets, and the RB set indication further indicates an RB set offset parameter indicating an offset of the one or more reserved RB sets with respect to the one or more scheduled RB sets.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
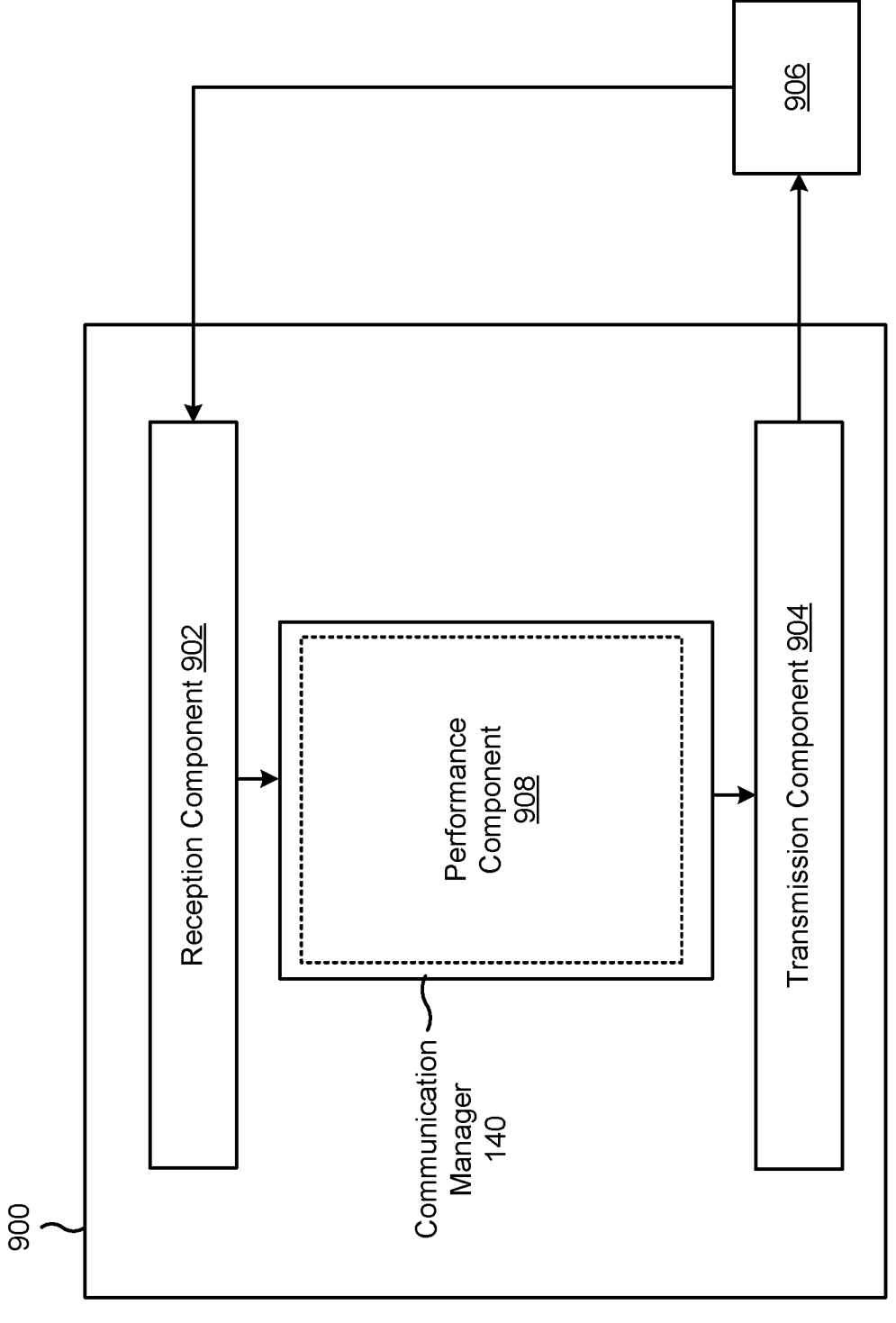
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a performance component 908, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a configuration of an FDRA associated with one or more scheduled interlaces for sidelink communication, wherein the FDRA is based at least in part on an RB associated with an SCI-1 communication. The performance component 908 may perform the sidelink communication in accordance with the FDRA. The reception component 902 may receive a configuration of an FDRA associated with one or more scheduled interlaces for sidelink communication, wherein the FDRA is based at least in part on a common reference point. The performance component 908 may perform the sidelink communication in accordance with the FDRA.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving a configuration of an FDRA associated with one or more scheduled interlaces for sidelink communication, wherein the FDRA is based at least in part on an RB associated with an SCI-1 communication; and performing the sidelink communication in accordance with the FDRA.

Aspect 2: The method of Aspect 1, wherein the FDRA includes an interlace indication indicating the one or more scheduled interlaces, and wherein the FDRA includes an RB set indication indicating one or more scheduled RB sets for the sidelink communication.

Aspect 3: The method of Aspect 2, wherein the interlace indication indicates the one or more scheduled interlaces using a bitmap, and wherein the bitmap indicates the one or more scheduled interlaces relative to the RB associated with the SCI-1 communication.

Aspect 4: The method of Aspect 2, wherein the interlace indication indicates the one or more scheduled interlaces using a resource indicator value (RIV), and wherein the RIV indicates the one or more scheduled interlaces relative to the RB associated with the SCI-1 communication.

Aspect 5: The method of any of Aspects 2-4, wherein the interlace indication further indicates one or more reserved interlaces for future sidelink communication.

Aspect 6: The method of Aspect 5, wherein the one or more reserved interlaces are the one or more scheduled interlaces.

Aspect 7: The method of Aspect 5, wherein the one or more reserved interlaces are different one or more interlaces than the one or more scheduled interlaces, and wherein the interlace indication further indicates an interlace offset parameter indicating an offset of the one or more reserved interlaces with respect to the one or more scheduled interlaces.

Aspect 8: The method of any of Aspects 2-7, wherein the RB set indication indicates the one or more scheduled RB sets relative to an RB set associated with the SCI-1 communication.

Aspect 9: The method of Aspect 8, wherein the RB set indication indicates a first group of zero or more contiguous RB sets associated with frequencies higher than a frequency band associated with the RB set associated with the SCI-1 communication, wherein the RB set indication indicates a second group of zero or more contiguous RB sets associated with frequencies lower than the frequency band of the RB set associated with the SCI-1 communication, and wherein the one or more scheduled RB sets include the first group of zero or more contiguous RB sets, the RB set associated with the SCI-1 communication, and the second group of zero or more contiguous RB sets.

Aspect 10: The method of Aspect 8, wherein the RB set indication indicates a group of zero or more contiguous RB sets associated with frequencies higher than a frequency band associated with the RB set associated with the SCI-1 communication, and wherein the one or more scheduled RB sets include the group of zero or more contiguous RB sets and the RB set associated with the SCI-1 communication.

Aspect 11: The method of any of Aspects 2-10, wherein the RB set indication further indicates one or more reserved RB sets for future sidelink communication.

Aspect 12: The method of Aspect 11, wherein the one or more reserved RB sets are the one or more scheduled RB sets.

Aspect 13: The method of Aspect 11, wherein the one or more reserved RB sets are different one or more RB sets than the one or more scheduled RB sets, and wherein the RB set indication further indicates an RB set offset parameter indicating an offset of the one or more reserved RB sets with respect to the one or more scheduled RB sets.

Aspect 14: The method of Aspect 11, wherein the one or more reserved RB sets are different one or more RB sets than the one or more scheduled RB sets, and wherein the RB set indication further indicates an RB set offset parameter indicating an offset of the one or more reserved RB sets with respect to the RB set associated with the SCI-1 communication.

Aspect 15: A method of wireless communication performed by a UE, comprising: receiving a configuration of an FDRA associated with one or more scheduled interlaces for sidelink communication, wherein the FDRA is based at least in part on a common reference point; and performing the sidelink communication in accordance with the FDRA.

Aspect 16: The method of Aspect 15, wherein the common reference point is based at least in part on a channel in which the sidelink communication is performed.

Aspect 17: The method of any of Aspects 15-16, wherein the common reference point is based at least in part on an RB size and a number of interlaces available for sidelink communication.

Aspect 18: The method of Aspect 17, wherein the common reference point is within a common reference point grid, wherein a size of the common reference point grid is a product of the RB size and the number of interlaces available for sidelink communication.

Aspect 19: The method of any of Aspects 15-18, wherein the FDRA includes an interlace indication indicating the one or more scheduled interlaces, and wherein the FDRA includes an RB set indication indicating one or more scheduled RB sets for sidelink communication.

Aspect 20: The method of Aspect 19, wherein the interlace indication further indicates one or more reserved interlaces for future sidelink communication.

Aspect 21: The method of Aspect 20, wherein the one or more reserved interlaces are the one or more scheduled interlaces.

Aspect 22: The method of Aspect 20, wherein the one or more reserved interlaces are different one or more interlaces than the one or more scheduled interlaces, and wherein the interlace indication further indicates an interlace offset parameter indicating an offset of the one or more reserved interlaces with respect to the one or more scheduled interlaces.

Aspect 23: The method of any of Aspects 19-22, wherein the RB set indication further indicates one or more reserved RB sets for future sidelink communication.

Aspect 24: The method of Aspect 23, wherein the one or more reserved RB sets are the one or more scheduled RB sets.

Aspect 25: The method of Aspect 23, wherein the one or more reserved RB sets are different one or more RB sets than the one or more scheduled RB sets, and wherein the RB set indication further indicates an RB set offset parameter indicating an offset of the one or more reserved RB sets with respect to the one or more scheduled RB sets.

Aspect 26: An apparatus for wireless communication at a device, comprising a processor; memory coupled with the processor; and instructions stored in the memory and executable by the processor to cause the apparatus to perform the method of one or more of Aspects 1-14.

Aspect 27: A device for wireless communication, comprising a memory and one or more processors coupled to the memory, the one or more processors configured to perform the method of one or more of Aspects 1-14.

Aspect 28: An apparatus for wireless communication, comprising at least one means for performing the method of one or more of Aspects 1-14

Aspect 29: A non-transitory computer-readable medium storing code for wireless communication, the code comprising instructions executable by a processor to perform the method of one or more of Aspects 1-14.

Aspect 30: A non-transitory computer-readable medium storing a set of instructions for wireless communication, the set of instructions comprising one or more instructions that, when executed by one or more processors of a device, cause the device to perform the method of one or more of Aspects 1-14.

Aspect 31: An apparatus for wireless communication at a device, comprising a processor; memory coupled with the processor; and instructions stored in the memory and executable by the processor to cause the apparatus to perform the method of one or more of Aspects 15-25.

Aspect 32: A device for wireless communication, comprising a memory and one or more processors coupled to the memory, the one or more processors configured to perform the method of one or more of Aspects 15-25.

Aspect 33: An apparatus for wireless communication, comprising at least one means for performing the method of one or more of Aspects 15-25.

Aspect 34: A non-transitory computer-readable medium storing code for wireless communication, the code comprising instructions executable by a processor to perform the method of one or more of Aspects 15-25.

Aspect 35: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus, comprising:
a processing system that includes one or more processors and one or more memories coupled with the one or more processors, the processing system configured to cause the apparatus to:
receive a configuration of a frequency domain resource allocation (FDRA) associated with one or more scheduled interlaces for sidelink communication, wherein the FDRA indicates one or more scheduled resource block (RB) sets, relative to a common reference point, for a sidelink communication based at least in part on one or more RB sets associated with a first stage sidelink control information (SCI-1) communication, the FDRA including an RB set indication indicating one or more reserved RB sets that are different from the one or more scheduled RB sets, wherein the common reference point corresponds to a frequency bandwidth; and perform the sidelink communication in accordance with the FDRA and in the one or more scheduled interlaces using an unlicensed sidelink spectrum.

2. The apparatus of claim 1, wherein the FDRA includes an interlace indication indicating the one or more scheduled interlaces.

3. The apparatus of claim 2, wherein the interlace indication indicates the one or more scheduled interlaces using a bitmap, and wherein the bitmap indicates the one or more scheduled interlaces relative to an RB associated with the SCI-1 communication.

4. The apparatus of claim 2, wherein the interlace indication indicates the one or more scheduled interlaces using a resource indicator value (RIV), and wherein the RIV indicates the one or more scheduled interlaces relative to an RB associated with the SCI-1 communication.

5. The apparatus of claim 2, wherein the interlace indication further indicates one or more reserved interlaces for future sidelink communication.

6. The apparatus of claim 5, wherein the one or more reserved interlaces are the one or more scheduled interlaces.

7. The apparatus of claim 5, wherein the one or more reserved interlaces are different one or more interlaces than the one or more scheduled interlaces, and wherein the interlace indication further indicates an interlace offset parameter indicating an offset with respect to the one or more scheduled interlaces.

8. The apparatus of claim 2, wherein the RB set indication indicates the one or more scheduled RB sets relative to an RB set from the one or more RB sets associated with the SCI-1 communication.

9. The apparatus of claim 8, wherein the RB set indication indicates a first group of zero or more contiguous RB sets associated with frequencies higher than a frequency band associated with the RB set associated with the SCI-1 communication, wherein the RB set indication indicates a second group of zero or more contiguous RB sets associated with frequencies lower than the frequency band of the RB set associated with the SCI-1 communication, and wherein the one or more scheduled RB sets include the first group of zero or more contiguous RB sets, the RB set associated with the SCI-1 communication, and the second group of zero or more contiguous RB sets.

10. The apparatus of claim 8, wherein the RB set indication indicates a group of zero or more contiguous RB sets associated with frequencies higher than a frequency band associated with the RB set associated with the SCI-1 communication, and wherein the one or more scheduled RB sets include the group of zero or more contiguous RB sets and the RB set associated with the SCI-1 communication.

11. The apparatus of claim 1, wherein one or more reserved RB sets are for future sidelink communication.

12. The apparatus of claim 11, wherein the FDRA indicates the one or more scheduled RB sets for the sidelink communication relative to an RB set in which the SCI-1 communication is transmitted.

13. The apparatus of claim 11, wherein the RB set indication further indicates an RB set offset parameter indicating an offset of the one or more reserved RB sets with respect to the one or more scheduled RB sets.

14. The apparatus of claim 11, wherein the RB set indication further indicates an RB set offset parameter indicating an offset of the one or more reserved RB sets with respect to an RB set associated with the SCI-1 communication.

15. The apparatus of claim 1, wherein the common reference point corresponds to a first channel of a plurality of 80 Megahertz (MHz) or 100 MHz channels, wherein a second common reference point corresponds to a second channel of the plurality of 80 MHz or 100 MHz channels, wherein the common reference point and the second common reference point are stored at the apparatus.

16. An apparatus comprising:

a processing system that includes one or more processors and one or more memories coupled with the one or more processors, the processing system configured to cause the apparatus to:

receive a configuration of a frequency domain resource allocation (FDRA) indicating one or more scheduled interlaces for sidelink communication relative to a common reference point, the common reference point known to a plurality of user equipments (UEs) communicating in sidelink, the FDRA including an interlace indication indicating one or more reserved interlaces that are different from the one or more scheduled interlaces, wherein the common reference point corresponds to a frequency bandwidth; and perform the sidelink communication in accordance with the FDRA.

17. The apparatus of claim 15, wherein the common reference point is for a channel in which the sidelink communication is performed, and wherein the channel comprises the frequency bandwidth.

18. The apparatus of claim 15, wherein the common reference point is based at least in part on a resource block (RB) size and a number of interlaces available for sidelink communication.

19. The apparatus of claim 18, wherein the common reference point is within a common reference point grid, wherein a size of the common reference point grid is a product of the RB size and the number of interlaces available for the sidelink communication.

20. The apparatus of claim 15, wherein the FDRA includes an interlace indication indicating the one or more scheduled interlaces.

21. The apparatus of claim 15, wherein the FDRA includes a resource block (RB) set indication indicating one or more scheduled RB sets.

22. The apparatus of claim 21, wherein the one or more scheduled RB sets are for the sidelink communication.

23. The apparatus of claim 21, wherein the interlace indication further indicates an interlace offset parameter indicating an offset of the one or more reserved interlaces with respect to the one or more scheduled interlaces.

24. The apparatus of claim 21, wherein the RB set indication further indicates one or more reserved RB sets for future sidelink communication.

25. The apparatus of claim 24, wherein the one or more reserved RB sets are the one or more scheduled RB sets.

26. The apparatus of claim 24, wherein the one or more reserved RB sets are different one or more RB sets than the one or more scheduled RB sets, and wherein the RB set indication further indicates an RB set offset parameter indicating an offset of the one or more reserved RB sets with respect to the one or more scheduled RB sets.

27. A method of wireless communication performed at a user equipment (UE), comprising:

receiving a configuration of a frequency domain resource allocation (FDRA) associated with one or more scheduled interlaces for sidelink communication, wherein the FDRA indicates one or more scheduled resource block (RB) sets, relative to a common reference point, for a sidelink communication based at least in part on one or more RB sets associated with a first stage sidelink control information (SCI-1) communication, the FDRA including an RB set indication indicating one or more reserved RB sets that are different from the one or more scheduled RB sets, wherein the common reference point corresponds to a frequency bandwidth; and performing the sidelink communication in accordance with the FDRA and in the one or more scheduled interlaces using an unlicensed sidelink spectrum.

28. The method of claim 27, wherein the FDRA includes an interlace indication indicating the one or more scheduled interlaces.

29. The method of claim 28, wherein the RB set indication indicates the one or more scheduled RB sets relative to an RB set from the one or more RB sets associated with the SCI-1 communication.

30. A method of wireless communication performed at a user equipment (UE), comprising:

receiving a configuration of a frequency domain resource allocation (FDRA) indicating one or more scheduled interlaces for sidelink communication relative to a common reference point, the common reference point known to a plurality of UEs communicating in sidelink, the FDRA including an interlace indication indicating one or more reserved interlaces that are different from the one or more scheduled interlaces, wherein the common reference point corresponds to a frequency bandwidth; and performing the sidelink communication in accordance with the FDRA.

* * * * *